April 25, 1950          N. NASTROM          2,505,717
EGG HOLDER AND BREAKER
Filed March 10, 1947          2 Sheets—Sheet 1
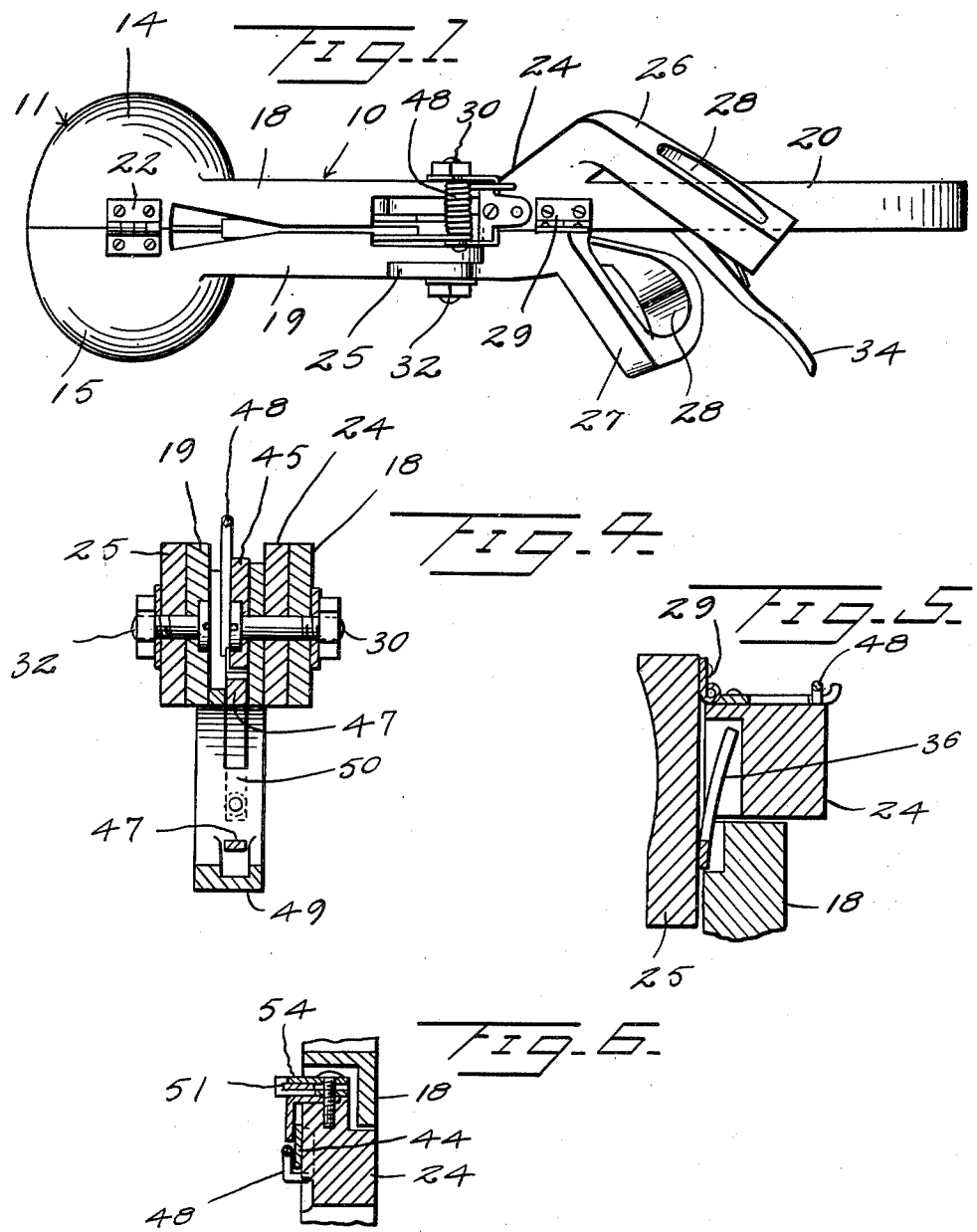
Inventor
Nels Nastrom
By Kimmel & Crowell
Attorneys April 25, 1950 — N. NASTROM — 2,505,717
EGG HOLDER AND BREAKER
Filed March 10, 1947 — 2 Sheets-Sheet 2
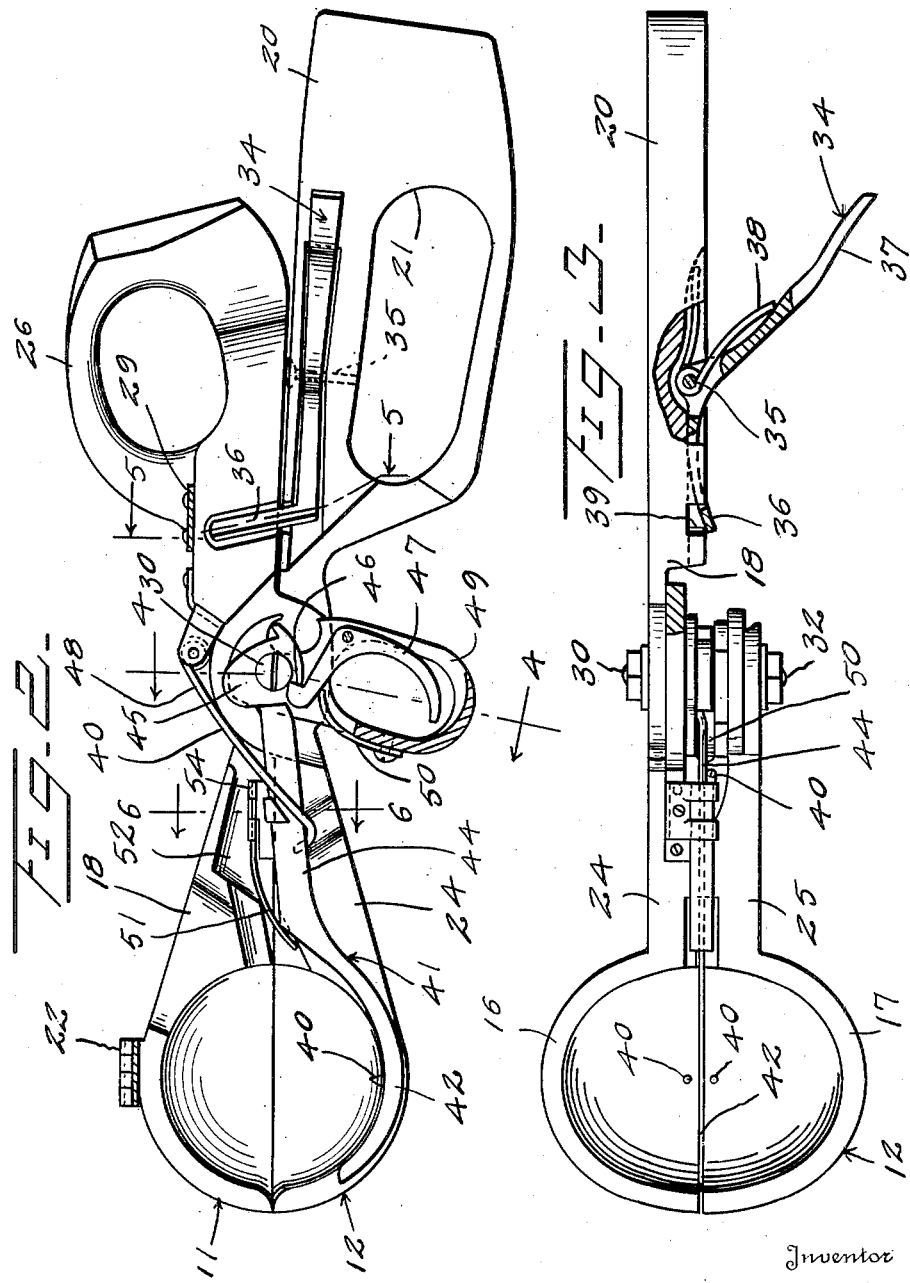
Inventor
Nels Nastrom
By Kimmel & Crowell
Attorneys Patented Apr. 25, 1950

2,505,717

UNITED STATES PATENT OFFICE 2,505,717

EGG HOLDER AND BREAKER

Nels Nastrom, Elk Mountain, Wyo.

Application March 10, 1947, Serial No. 733,586

3 Claims. (Cl. 146—2)

This invention relates to an egg breaking tool and more particularly to an improvement over the egg breaking tool in my prior Patent No. 1,870,741, issued August 9, 1932.

It is an object of this invention to provide an improved egg breaker of the kind to be more specifically described hereinafter by the use of which an egg shell may be split or cracked along a certain definite line so that the meat may be discharged while retaining the shell in the tool. By the use of this tool the egg shell is broken approximately halfway around the circumference by a spring-pressed knife blade so that the shell will not be shattered so that part of the shell is discharged with the meat, but a clean cut will be made on the shell so the entire shell is retained in the tool as the meat is discharged.

Another object of this invention is to provide an improved egg breaker of this kind having suitable handles for manipulating the cups for holding an egg and a suitable lever between the handles for applying increased force between the handles for opening the cups when they are held together by the egg shell being frictionally stuck in the cups or other causes which result in the sticking of the handles whereby a force greater than that which the fingers of an operator's hand may apply is required.

With the above and other objects in view, my invention consists in the arrangement, combination and details of construction disclosed in the drawings and specification, and then more particularly pointed out in the appended claims.

In the drawings,

Figure 1 is a top plan view of an improved egg breaker constructed according to an embodiment of this invention, Figure 2 is a side elevation, partly in section, of the egg breaker with the pivoted frame members on one side removed, Figure 3 is a top plan view, partly in section, of the lower cup members and their respective frames, Figure 4 is a transverse section taken on the line 4—4 of Figure 2, Figure 5 is a transverse section, partly broken away, taken on the line 5—5 of Figure 2, Figure 6 is a transverse section, partly broken away, taken on the line 6—6 of Figure 2.

Referring to the drawings, the numeral 10 designates generally an improved egg breaker for supporting an egg and cracking it so that the meat may be removed and the shell retained in the tool.

The egg breaker 15 is composed of a pair of upper and lower cup members 11 and 12 respectively, each cup member bisected transversely at the center thereof, providing a pair of cup sections 14 and 15 in the upper cup 11, and a pair of correlated cup sections 16 and 17 for the lower cup 12. Each of the cup members is formed with, or has attached thereto, a rearwardly extending frame member, an extension of which is formed to provide finger grips or handles.

With respect to the upper cup member 11, the section 14 is formed with a frame member 18, and the cup section 15 is formed with a frame member 19, and the frame member 18 is formed at its rear end with a handle 20. The handle 20 is formed with an elongated slot 21 intermediate the length thereof, through which several fingers of the user may be engaged.

The rearwardly extending frame member 19 of the cup section 15 is terminated at the forward end of the handle section 20 adjacent the frame member 18. The cup sections 14 and 15, together with their respective frame members 18 and 19, are pivotally connected together by a hinge 22 fixed to the upper side of the cup sections 14 and 15. The lower cup sections 16 and 17 are formed with rearwardly extending frame members 24 and 25 respectively. The frame member 24 is provided with a laterally inclined handle 26 at its rear end and the frame member 25 is formed with a similar handle 27.

The handles 26 and 27 are apertured as at 28 and extend angularly relative to a vertical plane, through the handle member 20. In holding an egg breaker of this construction, the thumb of the user is adapted to engage through the handles 26 and 27. The frame members 24 and 25 are pivotally connected together by a hinge 29 immediately forward of the handles 26 and 27. The pintle of the hinges 22 and 29 are in alignment so that the cups 11 and 12 may be separated with the cup sections 14 and 16 closed on one side, and the cup sections 15 and 17 closed on the other side of the separation.

The frame members of each cup member on the opposite sides of the hinges 22 and 29 are pivotally connected together. The frame member 18 is pivotally connected to the frame member 24 immediately forward of the handles 20 and 26 by a bolt 30. The frame members 19 and 25 are pivotally connected together by a pivot or bolt 32 disposed in transverse alignment with the bolt 30, whereby the cup sections 11 and 12 may be separated with the respective cup sections closed. The hinges 22 and 29 are disposed in alignment above the center of the pivots 30 and 32.

For forcing the frame members apart about the hinges there is provided a lever 34 pivotally mounted on the handle 20 of the frame member 18. The lever 34 is substantially L-shaped, being pivoted by a pin 35 intermediate its length, and an arm 36 is formed on the inner end of the lever, extending upwardly from the handle 20. The arm of the lever 34 connected to the pivot 35, is bent about the pivot so that a handle as 37 is formed which extends outwardly from the handle 20.

A spring 38 engages about the pivot 35 and between the handle 20 and the lever 34, for constantly urging the handle 37 of the lever 34 outwardly and the arm 36 inwardly into a recess 39 on the frame member 18. The arm 36 is adapted to engage with the frame member 25 so that pivotal movement of the lever 34 with the handle 37 being moved towards the handle 20 will effect rocking movement of the cup sections 15 and 17 about the hinges 22 and 29. This movement opening the cups 11 and 12 about the vertical center line of the tool is used in permitting the meat of the egg to be removed after the egg has been broken in the tool.

The cup sections 16 and 17 of the lower cup member 12 are formed near their abutting edges with pins 40 which are adapted to pierce or otherwise engage the egg shell for retaining it within the respective cup sections. A knife 41 is provided for breaking or cracking the egg when it is enclosed within the cup members 11 and 12. The knife 41 is formed with an arcuate blade 42 disposed between the cup sections 16 and 17 of the lower cup member 12, and is supported by a rearwardly extending arm 44. The arm 44 is pivotally connected to the pivot pin 30 which also pivotally connects the frame members 18 and 24.

A trip or catch 45 is fixed on the rear end of the arm 44 about the pivot 30. The trip 45 is formed with a notch 46 on the lower side thereof in which a trigger 47 is adapted to engage. A spring 48 is fixed at one end to the frame member 24 above the pivot 30 and extends downwardly between the frame members 18 and 19 for engagement with the lower edge of the knife 41 for constantly urging the blade 42 inwardly of the cup sections 16 and 17. The trigger 47 is pivotally mounted in a finger grip 49 which in turn is mounted pivotally from the pivot pin 30.

A spring 50, fixed at one end of the finger grip 49, engages the lower side of the trigger 47 for constantly urging the catch of the trigger into engagement with the notch 46 of the trip 45. In this manner the knife 41 may be pivoted downwardly out of the tool by moving the finger grip 49 rearwardly towards the handle 20 and the knife may be then released for sharply striking the egg within the tool by depressing the trigger 47, causing the catch to disengage from the notch 46, whereupon the spring 48 will return the knife 41 back to its original position and the blade 42 will extend inwardly of the cup members 16 and 17 for cracking the egg.

In the use and operation of this egg breaker, the egg may be first placed in the tool by separating the egg members 11 and 12 pivotally about the pivot pins 30 and 32. The tool is then closed and the egg cracked as described above by releasing the knife 41 from the trigger and the meat of the egg may then be taken from the tool by separating the cup sections about the hinges 22 and 29.

For cushioning the striking force of the knife 41 when it is released, a spring 51 is fixed on the frame member 24 in the recess 52 therein. The spring 51 is a leaf spring fixed at its rear end by a clamp 54 extending forwardly and downwardly for engaging the forward end of the arm 44 of the knife. The spring 51 will normally dispose the blade 42 between the cup sections 16 and 17 while permitting the blade 42 to extend inwardly of the lower cup member 12 when it is released by the trigger.

I do not mean to confine myself to the exact details of construction herein disclosed, but claim all variations falling within the purview of the appended claims.

What I claim is:

1. An egg breaker comprising upper and lower cups adapted to enclose an egg and each bisected transversely, frame members extending from the sections of the two cups, the frame members on each side of the division in the cups being pivotally connected, a knife suspended on one of the pivotal connections and disposed within the division of the lower cup, a trip secured to the pivoted end of the knife, a spring on one frame member engaging said knife yieldably holding the knife in raised position, a trigger suspended on the pivotal connection of said knife, operative connections between the trigger and the trip whereby to oscillate the knife, a laterally bent lever pivoted intermediate the length thereof to a frame member extending from one of said upper cup sections and swingable in a plane disposed at right angles to the axes of the pivotal connections of said frame members, and a bent portion on one end of said lever engageable with the frame member extending from the lower cup section on the other side of the division in the cups whereby the cup sections on opposite sides of the division will be separated when said one end of said lever is moved away from said frame member to which said lever is pivoted.

2. An egg breaker comprising upper and lower complementary cups, each of said cups being bisected transversely to provide a pair of cup sections, a frame member extending from each of said cup sections, a hinge connecting the pair of upper cup sections, a second hinge connecting the frame members extending from the pair of lower cup sections, a pivot member pivotally connecting a frame member extending from one of said upper cup sections to the frame member extending from the corresponding one of said lower cup sections, a second pivot member aligned with said first mentioned pivot member and pivotally connecting the frame member extending from the other of said upper cup sections to the frame member extending from the other of said lower cup members, a lever having one end pivotally carried by said frame member extending from said one of said upper cup sections and movable in a plane at right angles to the axis of said first mentioned pivot member, a longitudinally bent handle extending from said one end of said lever, spring means urging said lever against the latter frame member, and a vent portion on the other end of said lever engageable with said frame member extending from the other of said lower cup portions whereby the corresponding upper and lower cup sections will be separated along said first and second hinges when said handle on said lever is swung towards said frame member extending from said one of said upper cup sections.

3. An egg breaker comprising an upper cup and a lower cup, each of said cups being transversely bisected to provide a pair of cup sections, a frame member extending from each of said cup sections, first hinge means connecting said upper cup sections together, second hinge means connecting the frame members extending from the lower cup sections and aligned with said first hinge means, a pivot member pivotally connecting the frame member extending from one of said upper cup sections to the frame member extending from the corresponding one of said lower cup sections, a second pivot member aligned with said first mentioned pivot member and pivotally connecting the frame member extending from the other of said upper cup sections to the frame member extending from the other of said lower cup sections, a longitudinally extending laterally bent lever rockably mounted on the frame member extending from said one of said upper cup sections, and movable laterally thereof, said lever including a handle portion on one end thereof normally diverging relative to said frame member on which said lever is mounted, spring means urging said handle away from said latter frame member and the other end of said lever into flush engagement with said latter frame member, an extension on said other end of said lever extending above said latter frame member and engageable with the frame member extending from said other of said lower cup sections when said handle is moved towards said frame member extending from said one of said upper cup sections whereby said upper and lower cup sections will be transversely separated about said first and second hinge means.

NELS NASTROM.

REFERENCES CITED

The following references are of record in the file of this patent:

UNITED STATES PATENTS

| Number | Name | Date |
| --- | --- | --- |
| 1,765,491 | Jones | June 24, 1930 |
| 1,870,741 | Nastrom | Aug. 9, 1932 |